June 10, 1969 W. OLDHAM 3,448,471
STOWAGES FOR INFLATABLE LIFERAFTS
Filed Feb. 13, 1968
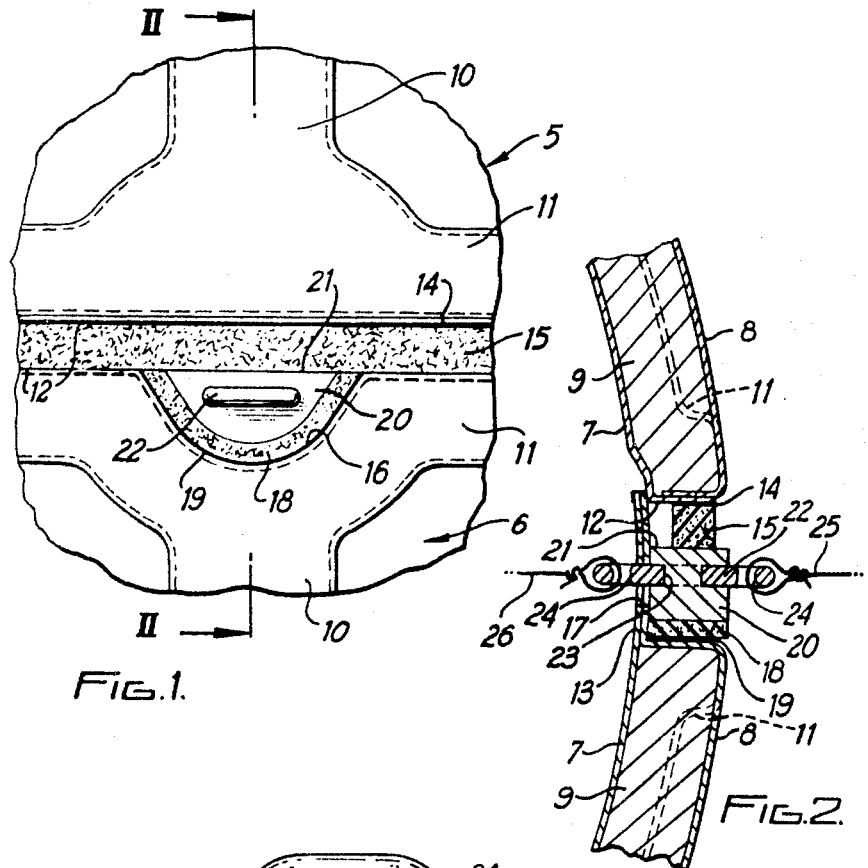
INVENTOR:
WALTER OLDHAM
BY
Bierman & Bierman
ATTORNEYS

United States Patent Office 3,448,471
Patented June 10, 1969

3,448,471
STOWAGES FOR INFLATABLE LIFERAFTS
Walter Oldham, Rochdale, England, assignor to Frankenstein Group Limited, a British company
Filed Feb. 13, 1968, Ser. No. 705,133
Claims priority, application Great Britain, Mar. 2, 1967, 9,824/67
Int. Cl. B63c 9/22
U.S. Cl. 9—11      5 Claims

ABSTRACT OF THE DISCLOSURE

A container for a stowed liferaft provided with self-inflation means operated by a trip-line connected thereto comprises two rigid members which are secured edge-to-edge by mechanical or adhesive means adapted to fail on expansion of said liferaft, a painter-line for tethering the latter to a parent ship or aircraft being attached to the outer end of a resilient plug fluidtightly engaged between said continer edges and having said trip-line attached to its inner end. Preferably at least one of the edges aforesaid is formed with a notch whose shape corresponds to the cross-section of the plug, resilient material being interposed between the container edges and also used to line said notch. The trip-line and painter-line may be attached to terminal eyes on a metal plate or other rigid link whose central portion is fixedly embedded in said plug.

---

This invention relates to stowages for inflatable liferafts which, when rolled or folded up in deflated condition, require to be protected against the effects of moisture, sunlight and accidental damage, but without hindrance to the self-inflation of such a raft when this is initiated by means external to the stowage.

In this connection the usual practice at the present time is to employ a rigid stowage comprising two identical or similar members moulded in a hard non-metallic material (such as polyester resin reinforced with glass fibre) and jointed edge-to-edge to form a buoyant enclosure for the deflated liferaft, the securing means employed being adapted to give way under the internal pressure set up when a self-inflation mechanism incorporated in the liferaft is tripped through the medium of a painter-line connecting the latter to the parent ship or aircraft and led out of the stowage through the sealed joint thereof.

One known method of securing the stowage members in assembled relation is by means of metal tensioning devices connecting the edges of such members or the ends of straps encircling the stowage, whilst in another known method the stowage members are secured together by means of a cemented joint in which at least one continuous strip of resilient cellular material is adhered to the edges aforesaid.

Whichever of these methods of securing the stowage members together is used, it has hitherto been the practice to connect the painter-line directly to the self-inflation mechanism of the contained liferaft after passing it through a resilient grommet which is gripped between the adjoined edges of the two members, but with this arrangement it has provided impossible, even when the part of the line accommodated in the grommet is waxed or similarly treated, to prevent absorbed moisture being conveyed through it into the interior of the stowage and eventually causing deterioration of the packed liferaft.

The object of the present invention is to obviate the above-mentioned drawback of the known line-entry means without in any way hindering separation of the stowage members and subsequent free flotation of the released raft.

According to this invention, in a stowage for an inflatable liferaft comprising two rigid members which are secured edge-to-edge by mechanical or adhesive means adapted to fail on expansion of the contained raft, a painter-line for tethering such raft to a parent ship or aircraft and a separate trip-line for the self-inflation mechanism of such raft are connected to opposite ends of a resilient plug engaged between the edges of the two stowage members in a fluid-tight manner.

Preferably the plug aforesaid is moulded around a rigid link whose opposite ends projects therefrom and are formed as eyes for connection respectively to the two lines aforesaid.

In the accompanying drawings,
FIG. 1 is a fragmentary side elevation of a liferaft stowage having line-entry means in accordance with the present invention;
FIG. 2 is a section on the line 2—2 of FIG. 1; and
FIG. 3 is a plan view of the resilient plug aforesaid.

In the sample illustrated, the invention is shown applied to a known liferaft stowage assembly in the form of a cylinder with rounded ends and divided along a diametral plane in to two substantially identical halves 5, 6 of which comprises inner and outer skins 7, 8 moulded in a glass-fibre reinforced polyester or other resin with an interlayer 9 of polyvinyl-chloride or other suitable synthetic foam.

Each of the stowage members 5, 6 is reinforced by a plurality of circumferential ribs 10 and a thickened edge portion 11 with a flat jointing face 12, which in the case of the member 5 is covered by the superimposed margins of the skins 7, 8. The face 12 of the member 6, on the other hand, is covered only by the outer skin 8 whose margin is united to that of the inner skin 7 to form a spigot 13 standing perpendicular to the face 12.

In the case of the member 5 this face is continuous and has cemented thereto at 14 a gasket 15 of synthetic rubber sponge which may be of (say) ½-inch square section.

The flat jointing face 12 of the stowage member 6 is interrupted, preferably at the end of one of the reinforcing ribs 10, by a D-shaped notch 16, 2½ inches wide by 1⅛ inches deep, the spigot 13 having a smaller incut 17 of corresponding profile.

Such notch is lined with a strip 18 of synthetic rubber sponge, ¼-inch thick and bonded in place at 19, which provides a seating for a relatively rigid synthetic rubber plug 20 having a complementary cross-section with a flat face 21 opposed to the sealing gasket 15.

A flat brass plate 22 with rounded ends and measuring (say) 2¼ inches long, 1¼ inches wide and ¼-inch thick, is disposed parallel to the flat face 21 of the plug 20, which is moulded around its central portion where a hole 23 is provided in the plate to ensure its effective keying to the synthetic rubber.

Both ends of the plate 22 project from the plug 20 and are formed with slots 24 for connection to an external painter-line 25 and internal trip-line 26 respectively.

It will be appreciated that, when a jerk is applied to the painter-line 25 (for example, by jettisoning of the stowage whilst such line is secured inboard of the parent craft) the plug 20 is at once extracted from the sponge-lined notch 16 and the pull thereon is transmitted through the trip-line 26 to the self-inflation mechanism of the stowed liferaft.

Obviously, if desired, the cut-out for reception of the plug 16 may be formed partly in one of the stowage members 5, 6 and partly in the other.

I claim:
1. Marine lifesaving equipment comprising a liferaft, means incorporated in said liferaft for effecting self- inflation thereof, a trip-line for actuating said self-inflation means, a pair of stowage members collectively forming a complete container for said liferaft in uninflated condition, means for securing said stowage members edge-to-edge and adapted to fail on expansion of said liferaft, a resilient plug fluidtightly engaged between the adjoined edges of said stowage members and having said trip-line attached to the inner end thereof, and a painter-line attached to the outer edge of said plug for connecting said liferaft to a parent craft.

2. Equipment as claimed in claim 1, including a resilient gasket interposed between the adjoined stowage-member edges, a least one of which is formed with a rounded notch to accommodate said plug, and a lining of resilient material to the periphery of said notch.

3. Equipment as claimed in claim 1 and wherein the plug is of D section, including an endless resilient gasket interposed between the adjoined stowage-member edges, one of which has a notch corresponding in shape to the cross-section of said plug, and a resilient lining bonded to the curved edge of said notch whose mouth is spanned by said gasket.

4. Equipment as claimed in claim 1, and including a rigid link formed with eyes at opposite ends for connection to said trip-line and painter-line respectively, the central portion of said link having said plug moulded around it.

5. Equipment as claimed in claim 1, and including a metal plate formed with eyes at opposite ends for connection to said trip-line and painter-line repectively, the material of said plug being moulded around the central part of said plate and penetrating into an opening therein.

References Cited
FOREIGN PATENTS 1,007,054 10/1965 Great Britain.
1,036,110 7/1966 Great Britain.

TRYGVE M. BLIX, *Primary Examiner.*